United States Patent
Baig et al.

(10) Patent No.: US 11,024,040 B2
(45) Date of Patent: *Jun. 1, 2021

(54) DYNAMIC OBJECT TRACKING

(71) Applicant: SEIKO EPSON CORPORATION, Tokyo (JP)

(72) Inventors: Qadeer Baig, Ajax (CA); Jia Li, Aurora (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,549

(22) Filed: Jun. 17, 2020

(65) Prior Publication Data

US 2020/0320720 A1 Oct. 8, 2020

Related U.S. Application Data

(63) Continuation of application No. 16/130,317, filed on Sep. 13, 2018, now Pat. No. 10,719,944.

(51) Int. Cl.
*G06T 7/73* (2017.01)
*G06T 7/246* (2017.01)
(Continued)

(52) U.S. Cl.
CPC .......... *G06T 7/248* (2017.01); *G02B 27/0172* (2013.01); *G06F 3/147* (2013.01);
(Continued)

(58) Field of Classification Search
CPC ..... G06T 7/248; G06F 3/011; G02B 27/0172; G02B 2027/0178; G02B 2027/014; G02B 2027/0138
(Continued)

(56) References Cited

U.S. PATENT DOCUMENTS 10,365,710 B2   7/2019 Yang
10,380,763 B2   8/2019 Levinshtein et al.
(Continued)

OTHER PUBLICATIONS

Wangsiripitak et al., "Avoiding moving outliers in visual SLAM by tracking moving objects," 2009 IEEE International Conference on Robotics and Automation, Kobe, Japan, May 12-17, 2009, 6 pages.
(Continued)

*Primary Examiner* — Congvan Tran
(74) *Attorney, Agent, or Firm* — Oliff PLC

(57) ABSTRACT

A method of determining and displaying movement of an object in an environment using a moving camera includes identifying later environment features located in the environment in a later image, earlier environment features located in the environment in an earlier image, and earlier object features located on the object in the earlier image. The method further includes estimating object features in the later image using the earlier object features and a determined camera movement. The method further includes locating, in the later image, matched object features that are actual object features in the later image at a same location as the estimated object features. The method further includes determining that the object has moved between the earlier image and the later image if a number of matched object features does not exceed a threshold.

20 Claims, 9 Drawing Sheets

(51) Int. Cl.
  *G06F 3/147* (2006.01)
  *G02B 27/01* (2006.01)
(52) U.S. Cl.
  CPC .......... *G06T 7/74* (2017.01); *G02B 2027/014* (2013.01); *G02B 2027/0138* (2013.01); *G06T 2207/10016* (2013.01); *G06T 2207/30244* (2013.01)
(58) Field of Classification Search
  USPC ...................................................... 382/103
  See application file for complete search history.

(56) References Cited

U.S. PATENT DOCUMENTS

| | | | | |
|---|---|---|---|---|
| 10,429,923 | B1* | 10/2019 | Johnston | G02B 27/0176 |
| 2010/0321409 | A1 | 12/2010 | Komori et al. | |
| 2013/0083173 | A1* | 4/2013 | Geisner | G09G 3/003 |
| | | | | 348/51 |
| 2013/0286004 | A1* | 10/2013 | McCulloch | G06T 19/006 |
| | | | | 345/419 |
| 2015/0130699 | A1 | 5/2015 | Cho et al. | |
| 2016/0011420 | A1 | 1/2016 | Jang et al. | |
| 2016/0026253 | A1* | 1/2016 | Bradski | H04N 13/344 |
| | | | | 345/8 |
| 2016/0037998 | A1 | 2/2016 | Kawashima et al. | |
| 2016/0321022 | A1 | 11/2016 | Kajita et al. | |
| 2017/0235377 | A1* | 8/2017 | Marcolina | G06T 17/10 |
| | | | | 715/849 |
| 2017/0270711 | A1* | 9/2017 | Schoenberg | G06T 7/20 |
| 2018/0373318 | A1* | 12/2018 | Yang | G06F 3/012 |
| 2019/0295285 | A1* | 9/2019 | Shinohara | G06T 7/73 |
| 2020/0090704 | A1* | 3/2020 | Lim | G11B 27/34 |

OTHER PUBLICATIONS

Wang et al., "Online Simultaneous Localization and Mapping with Detaction and Tracking of Moving Objects; Theory and Results from a Ground Vehicle in Crowded Urban Areas," Proceedings of the 2003 IEEE International Conference on Robotics & Automation, Taipei, Taiwan, Sep. 14-19, 2003, pp. 842-849.

* cited by examiner

DYNAMIC OBJECT TRACKING

CROSS-REFERENCE

This application is a continuation of U.S. application Ser. No. 16/130,317, filed Sep. 13, 2018, the contents of which are incorporated herein by reference.

BACKGROUND

1. Technical Field

The disclosure relates generally to the field of object detection and pose estimation in image data streams, and more specifically to augmented reality system including object detection and pose estimation in image data streams.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that the software maintains current information on a location of a real-world object within a camera field of view. Thus, the real-world object can be "followed" by a displayed artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also important in many AR implementations. This means that a virtual object will stay in one location in the scene, regardless of the movement of the user.

One platform for implementing AR is the smartphone or tablet. The presence of a camera, display, and processor on the same device allows for software to easily add artificial elements to a live scene captured by the camera. Moreover, the presence of motion sensors and locators (e.g. accelerometers and GPS) on these devices is exploited by the software to better implement AR.

Another platform is the head mounted display (HMD) which can implement AR providing richer AR experience. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

SUMMARY

Object tracking becomes more difficult when both the camera and tracked object are moving. It can be difficult for software to distinguish between object motion and camera motion, and achieving highly accurate object tracking may not be possible in every scenario.

In part to overcome these difficulties, embodiments of this disclosure include a method of determining and displaying movement of an object in an environment using a moving camera. The method includes acquiring an earlier image and a later image of the environment from an image stream captured by the camera. The method further includes identifying later environment features located in the environment in the later image, earlier environment features located in the environment in the earlier image, and earlier object features located on the object in the earlier image. The method further includes determining a camera movement from the earlier image to the later image using a difference in location between the earlier environment features and the later environment features. The method further includes estimating object features in the later image using the earlier object features and the determined camera movement. The method further includes locating, in the later image, matched object features that are actual object features in the later image at a same location as the estimated object features. The method further includes determining that the object has moved between the earlier image and the later image if the number of matched object features does not exceed a threshold. The method further includes determining that the object has not moved between the earlier image and the later image if the number of matched object features exceeds the threshold. The method further includes displaying a notification if the object has moved.

Embodiments of the present disclosure further include a non-transitory computer readable medium that embodies instructions that cause one or more processors to perform a method. The method includes acquiring an earlier image and a later image of an environment from an image stream captured by a camera. The method further includes identifying later environment features located in the environment in the later image, earlier environment features located in the environment in the earlier image, and earlier object features located on the object in the earlier image. The method further incudes determining a camera movement from the earlier image to the later image using a difference in location between the earlier environment features and the later environment features. The method further includes estimating object features in the later image using the earlier object features and the determined camera movement. The method further includes locating, in the later image, matched object features that are actual object features in the later image at a same location as the estimated object features. The method further includes determining that the object has moved between the earlier image and the later image if the number of matched object features does not exceed a threshold. The method further includes determining that the object has not moved between the earlier image and the later image if the number of matched object features exceeds the threshold. The method further includes instructing a display to displaying a notification if the object has moved.

Advantages of such embodiments may include that the camera pose can be tracked with respect to both the environment and the object. Thus, a moving camera can be used to detect and track a moving object.

In some embodiments, if the object has moved, the method further includes determining a pose of the object in the later image using the actual object features in the later image and the earlier object features, and updating a location of a displayed object based on the determined pose of the object.

Advantages of such embodiments may include that the system can revert to traditional object tracking from environment tracking, which may have better performance for tracking a moving object.

In some embodiments, the method further includes, if the object leaves a field of view of the camera: relocating the object in an image in the image stream if the object re-enters the field of view.

Advantages of such embodiments may include that an object of interest can be quickly reacquired if it temporarily leaves the field of view.

In some embodiments, the method further includes determining a pose of the object before the earlier image is acquired, by locating object features stored in a memory in an image in the image stream. In such embodiments, in the identifying earlier object features and earlier environment features, the pose of the object is used to distinguish between the earlier object features and the earlier environment features.

Advantages of such embodiments may include that the object pose is determined when the object is static, resulting in higher accuracy. Moreover, it can facilitate identifying object features.

In some embodiments, the earlier environment features and earlier object features are identified by distinguishing between environment features and object features in an image in the image stream, and the method further includes generating a collection of object features by obtaining additional object features after distinguishing between environment features and object features.

Advantages of such embodiments may include that more object features are generated, which can improve accuracy of the method by increasing the number of object features used to determine movement.

In some embodiments, the later image is a current image in the image stream, and the earlier image is acquired from a memory.

Advantages of such embodiments may include that the method is being enacted in real-time to track camera and object pose.

In some embodiments, the camera and display are components of one of: a head mounted display, a smartphone, and a tablet.

Advantages of such embodiments may include that the method is used on a readily available device including components that can be used to perform steps of the method.

Embodiments of the present disclosure further include a head mounted display that determines and displays movement of an object in an environment. The head mounted display includes a camera that captures an image stream of the environment, including an earlier image (an image at a first time) and a later image (an image at a second time later than the first time). The head mounted display further includes a processor configured to identify later environment features located in the environment in the later image, earlier environment features located in the environment in the earlier image, and earlier object features located on the object in the earlier image. The processor is further configured to determine a camera movement from the earlier image to the later image using a difference in location between the earlier environment features and the later environment features. The processor is further configured to estimate object features in the later image using the earlier object features and the determined camera movement. The processor is further configured to locate, in the later image, matched object features that are actual object features in the later image at a same location as the estimated object features. The processor is further configured to determine that the object has moved between the earlier image and the later image if the number of matched object features does not exceed a threshold. The processor is further configured to determine that the object has not moved between the earlier image and the later image if the number of matched object features exceeds the threshold. The head mounted display further includes a display that displays a notification if the object has moved.

In some embodiments, the processor is further configured to, if the object has moved: determine a pose of the object in the later image using the actual object features in the later image and the earlier object features; and update a location of a displayed object based on the determined pose of the object.

In some embodiments, the processor is further configured to, if the object leaves a field of view of the camera, relocate the object in an image in the image stream if the object re-enters the field of view.

In some embodiments, the processor is further configured to determine a pose of the object before the earlier image is acquired, by locating object features stored in a memory in an image in the image stream. In such embodiments, in the identifying earlier object features and earlier environment features, the pose of the object is used to distinguish between the earlier object features and the earlier environment features.

In some embodiments, the processor identifies the earlier environment features and earlier object features by distinguishing between environment features and object features in an image in the image stream, and is further configured to generate a collection of object features by obtaining additional object features after distinguishing between environment features and object features.

In some embodiments, the head mounted display further includes a memory, the later image is a current image in the image stream, and the earlier image is acquired from the memory.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
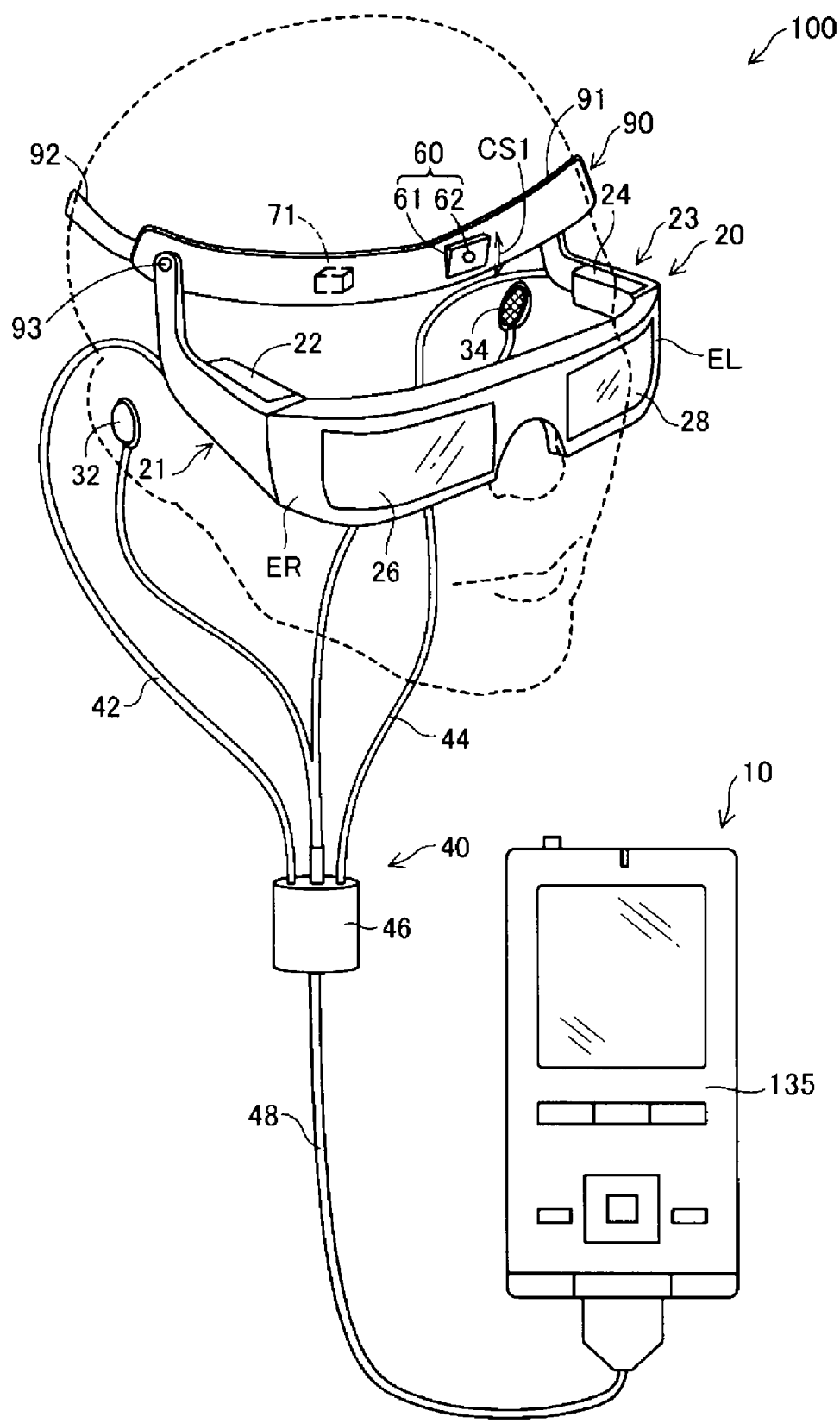
FIG. 1 is a diagram illustrating a schematic configuration of an example HMD.

FIG. 1 shows a schematic configuration of an HMD 100. The HMD 100 is a head mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
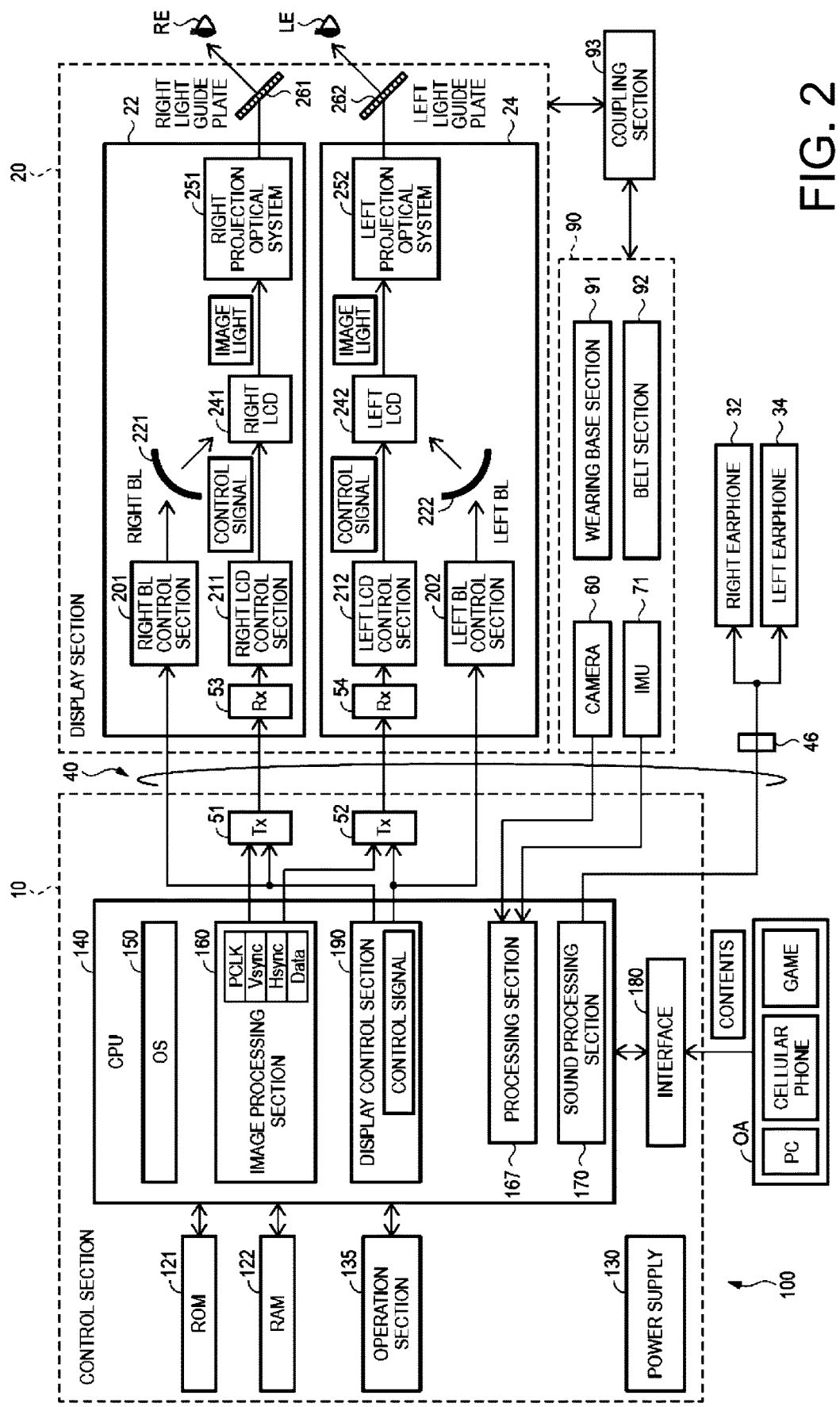
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a homography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The above descriptions with respect to FIGS. 1 and 2 explain one embodiment of the HMD. However, the device to which the following disclosed software is applied may be an imaging device other than an HMD. For example, the device may be an imaging device that has no function of displaying an image. Alternatively, the device could be a smartphone or tablet.

Using the HMD, or another device having a camera and display such as a smartphone or tablet, object tracking can be achieved using an object detection and pose estimation (ODPE) process. Object tracking is used to implement many AR functions, such as dialogue boxes that follow real-world objects. For such functions, the location of the object relative to the camera/display should be known in real-time. In many instances, ODPE involves identifying an object using a CAD model of the object and images of the object obtained from an image stream of the camera. Once the object is detected, the relative position to the camera (or pose) is estimated, and object tracking is performed. With ODPE, the pose used for object tracking is typically a pose of the object with respect to the camera. However, as will be seen below, a coordinate system can be developed such that camera pose and object pose is tracked with respect to the world frame of reference (or a global coordinate system).

In embodiments described herein, a method other than ODPE is used which can be referred to as simultaneous localization and mapping (SLAM). With SLAM, the camera's pose relative to the environment is determined. Thus, the camera's position in a world frame of reference is known. This facilitates accurate tracking of the camera pose, even as the camera is moved through the environment. SLAM works by acquiring tracked features in the environment, and then as time progresses in the image stream, measuring an amount of movement of the feature points. This amount of movement can be used to calculate the motion of the camera, and the camera pose is updated with respect to the world frame of reference.

Although SLAM allows for accurate tracking of the camera pose, it is more complicated to track moving objects using SLAM. This difficulty partly arises from the challenges of tracking a moving object using a moving camera (i.e. the difficulty of distinguishing camera movement from object movement). However, accurate tracking of both the object and camera with respect to a world frame of reference can be achieved using methods described herein.

In SLAM-based camera pose tracking (e.g., visual SLAM, the environment is considered to be static or at least most part of it should be static (according to an embodiment). The objective of visual SLAM is to track features in the environment to estimate camera pose with respect to the environment. However, tracking might fail if a significant part of the environment starts moving. Therefore, moving objects in the environment are generally considered outliers and visual SLAM algorithms do not track them. Little work has been done on moving object detection and tracking in visual SLAM although in SLAM solutions involving depth data some framework exists to detect and track moving objects.

On the other hand, ODPE has been used in AR application software. According to some methods herein, ODPE is used to initialize the object pose determination, and SLAM is subsequently used for tracking. This has two potential advantages: providing a true scale for SLAM, and the object pose 1040 can be tracked in subsequent camera images using SLAM.

Figure 10:
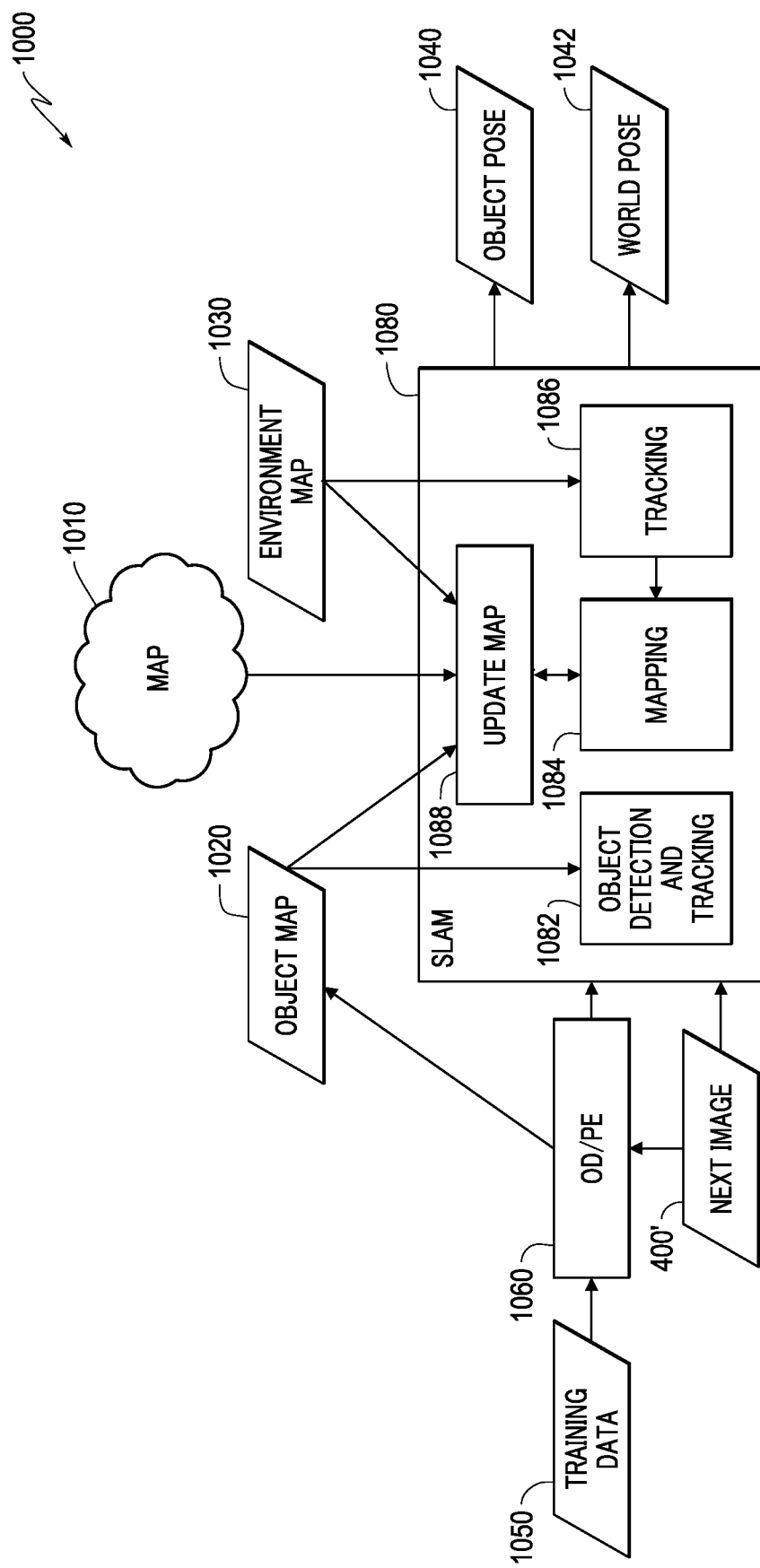
FIG. 10 is a block diagram of a system according to one embodiment.

The system 1000 shown in FIG. 10 works with visual SLAM 1080 to detect and track moving objects with SLAM tracking 1086. Normally, visual SLAM builds a map 1010 and tracks this map over time to estimate camera pose. The tracking system 1000 divides the map 1010 into two segments: one segment belonging to environment 1030 and other one belonging to object 1020. In order to support tracking of the moving object, system 1000 first determines if the object is present on the place where it was last seen if camera is estimated to be looking in that direction; otherwise it performs a special detection and tracking process for the features present in the segment belonging to object.

When the first image is input to the system 1000, it starts with the ODPE module 1060 that uses training data 1050 for the object detection and provides the initial pose of the object and object map 1020, which is a set of 3D points belonging to feature points on the object. The same object map 1020 provided by this system also serves as the first environment map 1030. An advantage of initializing SLAM system 1080 with ODPE pose and map is that the points in this initial map are on true world scale (given that training was on scale) and hence the subsequent tracking by SLAM system will be on scale.

After initialization when a later image 400' (a later image being an image received by the camera at a time later than an earlier image received at a first time) is input to the SLAM system tracking module 1082 extracts the features and tries to match them with the features in the earlier image (matching can be done either in certain sized windows around each feature or using visual bag of words approach). If the object is still in the field of view, system 1000 may find matches. In this later image 400', the true matches will be with the features only on the object.

The system 1000 should identify if the object is moving or not, since, if the object is moving but the system thinks that it is not moving then updates to map 1010 by map updating process 1088 will be wrong.

To find if the object is moving or not system 1000 calculates the pose of object using the matches determined above in later image 400'. At this point, the system 1000 has two object poses: one from a first image (earlier image) and the other from the later image 400'. Using these two poses, system 1000 can calculate baseline between two camera poses (assuming that object did not move and that camera moved only). Then using this base line and epipolar geometry (i.e. based on epi-poles of captured images), system 1000 calculates an epipolar line (e.g. line 416 in FIG. 4B) in the later 400' image for each feature in first image 400 that does not belong to object (which means ignoring the matches used for pose calculation in later image 400') and search each of these features along this line to find matches. If the object did not move and only camera moved then system 1000 finds many matches; otherwise only few to no matches will be found. Using a threshold on this number of matches system 1000 decides if the object has moved in later image 400' or not.

If the object is determined to be moving in above steps the object pose is known, however there will not be any known world pose 1042 (or camera pose in world image of reference) since system 1000 has started with observing a moving object.

If the object is determined to be static, then the mapping process 1084 creates new map points for features matched in two images, using epipolar geometry. The new points created in this step may also belong to environment.

Figure 3:
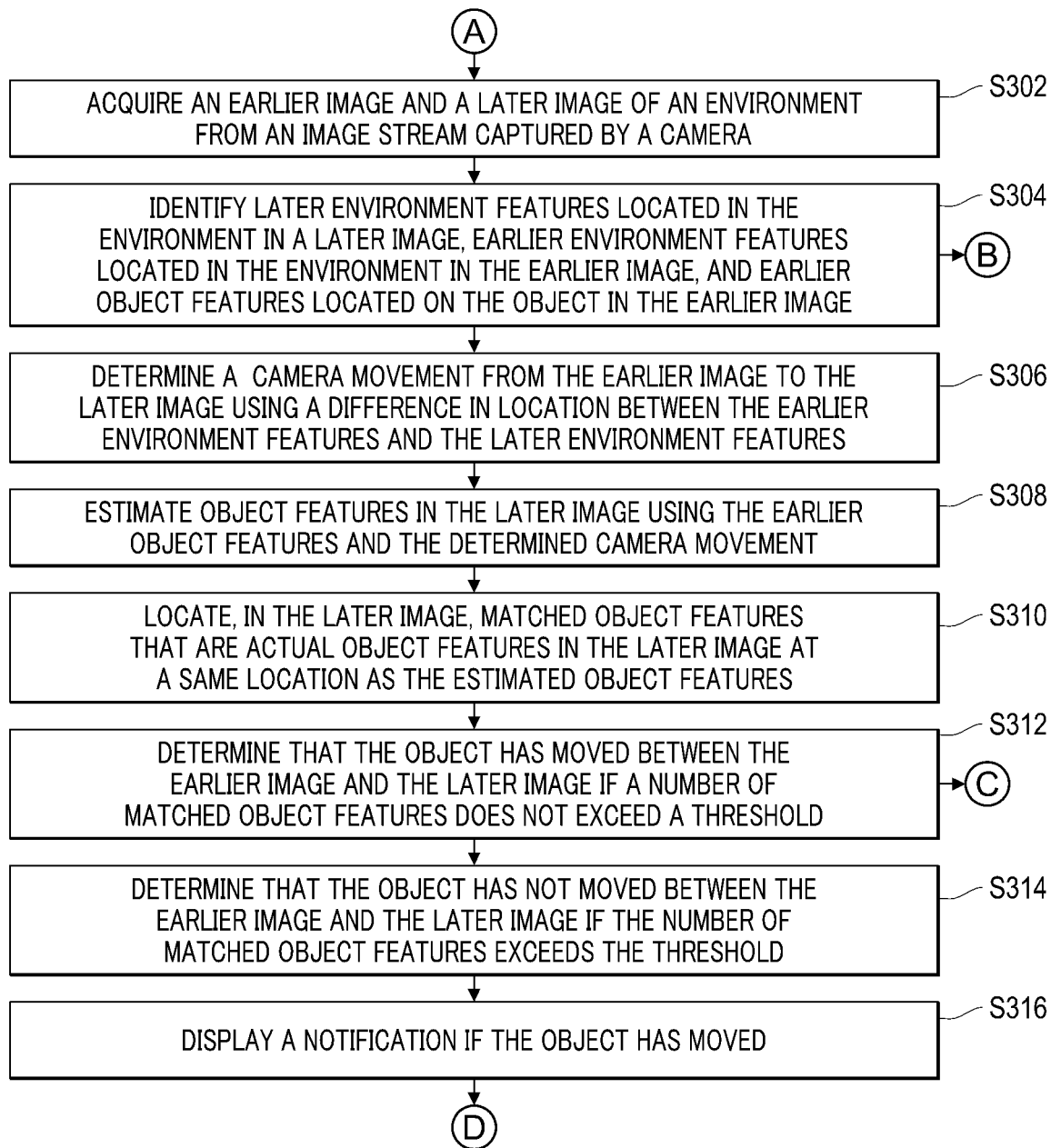
FIG. 3 is a flowchart of a method according to one embodiment.

FIG. 3 is a flowchart of one such embodiment. The first step is to acquire an earlier image and a later image of an environment from an image stream captured by a camera (S302). In this step, the camera 60 acquires an image stream, including an earlier image and a later image. In some embodiments, the later image is a current image in the image stream, and the earlier image is acquired from a memory (e.g. ROM 121, RAM 122). The earlier and later images include the environment and the object in several embodiments.

Figure 4B:
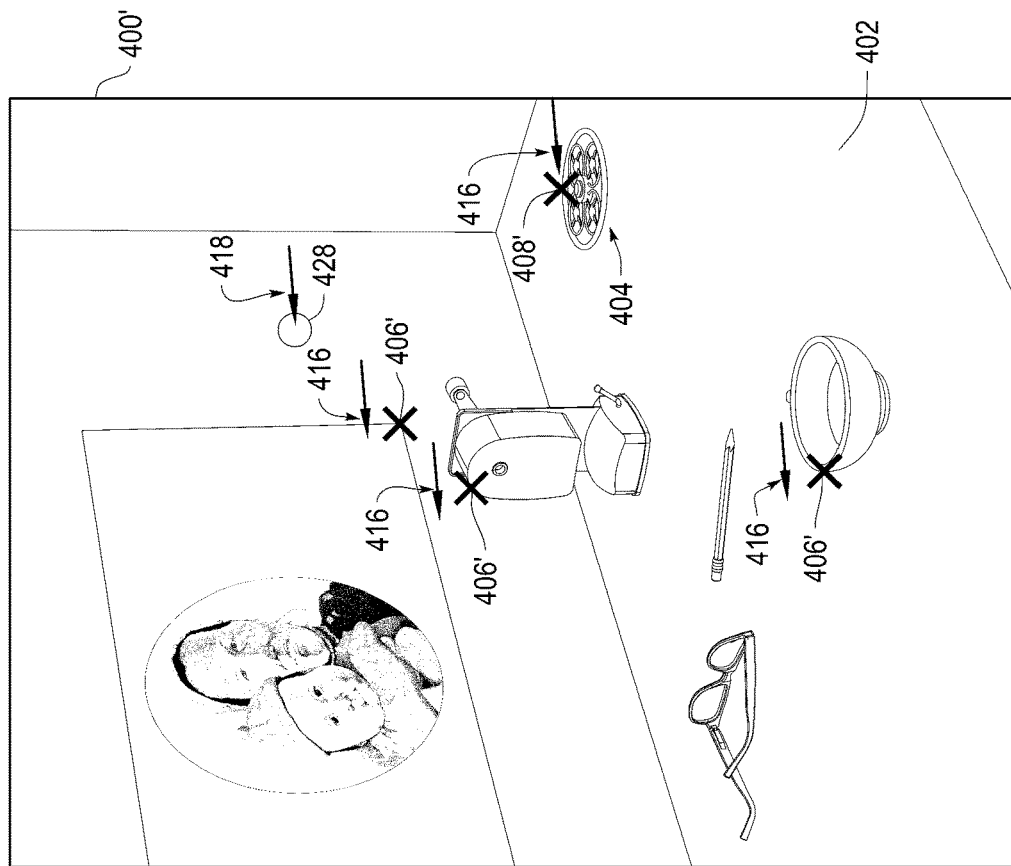
FIG. 4B is a captured later image of the environment according to one embodiment.
Figure 4A:
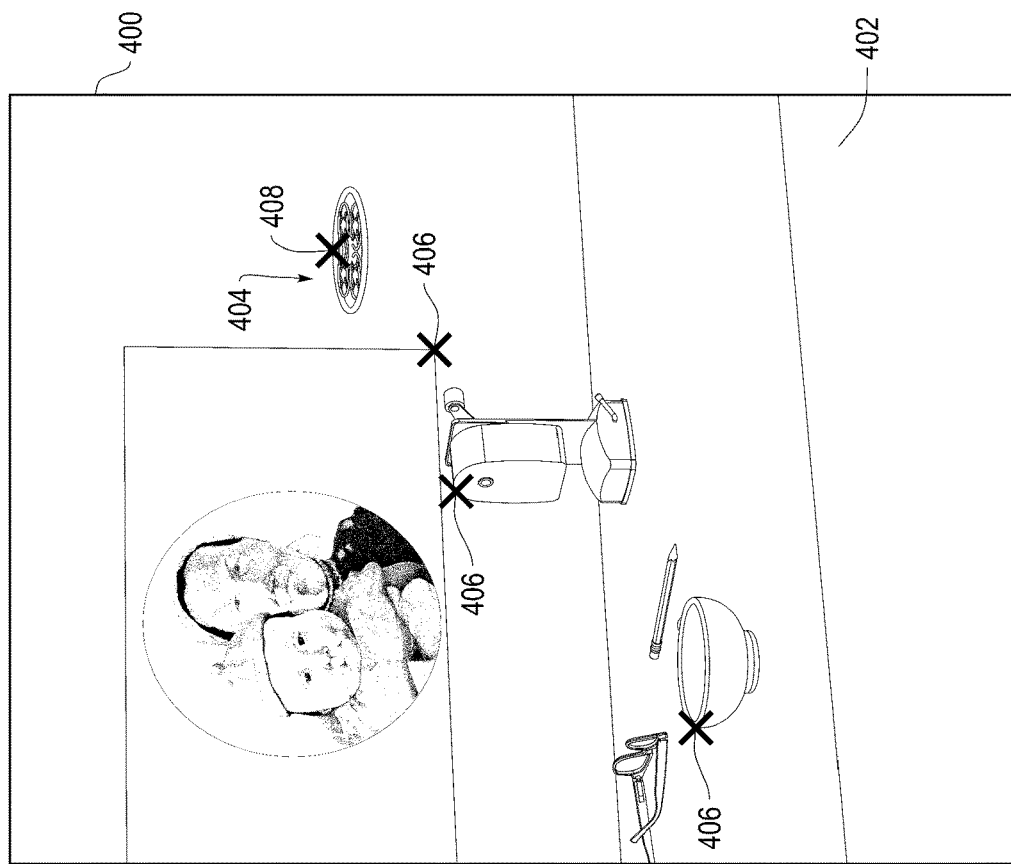
FIG. 4A is a captured earlier image of an environment according to one embodiment.
Figure 4C:
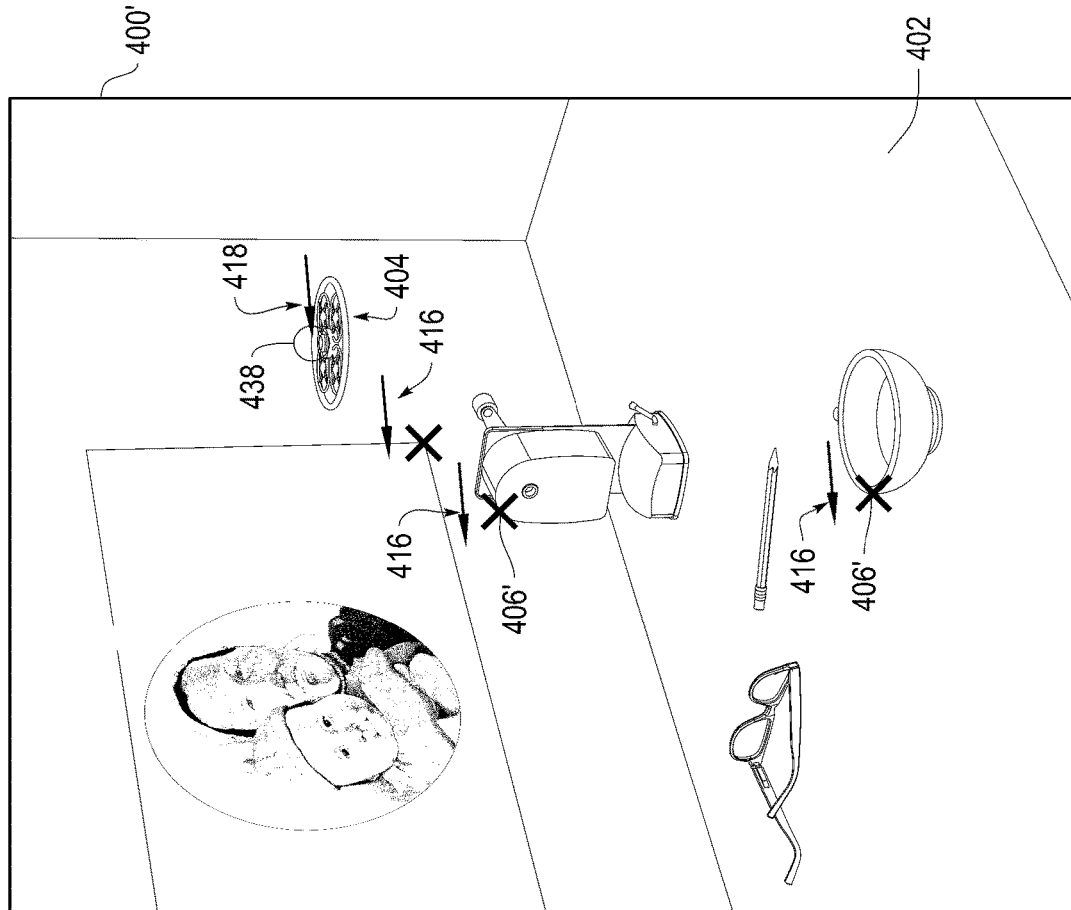
FIG. 4C is a captured later image of the environment according to one embodiment.

FIG. 4A shows one embodiment of the earlier image 400, and FIGS. 4B and 4C show embodiments of the later image 400' of environment 402 and object 404.

After the earlier image 400 and later image 400' are acquired, the next step is to distinguish between object features 408, 408' and environment features 406, 406'. This can be achieved by using a computer model (i.e. 3D CAD model) of the object 404. The CAD model of the object 404 may include feature points of the object 408, 408', in different poses. In some embodiments, a 3D CAD model may not include texture features that can also be used as features. The computer identifies the object pose (3D pose) in the earlier image 400 using e.g. ODPE, by first seeking a closest view of the 3D model, second obtaining a set of 2D feature points by rendering the 3D model at the view, and third refining the view, or model pose, in the way the re-projection error is minimized based on correspondences between object features in the image frame and 3D points in the 3D model coordinate system. The CAD model can also provide information about the size and shape of the tracked object 404, which can also be used to locate feature points in the image that belong to the object 404. Object feature points 408, 408' can be distinguished from other environment features 406, 406' once they are located and known. By differentiating between object feature points 408, 408' and environment feature points 406, 406', the processor divides an internal map of the environment 402 into an object portion and an environment portion.

Once the software or processor can distinguish between object features and environment features, it identifies later environment features 406' located in the environment 402 in a later image 400', earlier environment features 406 located in the environment 402 in the earlier image 400, and earlier object features 408 located on the object 404 in the earlier image 400 (S304). This step is performed by a processor or software analyzing the images 400, 400'. The features (406, 406', 408) are identified as described above and by locating areas of high contrast, using a CAD model, using edge analysis, or using training data. In some embodiments, feature points in the environment and on the object are selected based on the ease with which they can be tracked by the camera and software.

After the features (406, 406', 408) are identified, the next step is to determine a camera movement from the earlier image 400 to the later image 400' using a difference in location 416 between the earlier environment features 406 and the later environment features 406'. As can be seen when comparing FIG. 4A to FIGS. 4B and 4C, the camera has moved from the earlier image 400 to the later image 400', resulting in a change of viewpoint (camera pose). The motion of the camera can be derived from the change in location (shown by arrows 416) from the earlier environment features 406 to the later environment features 406'.

From the location change of the environment features 416, the camera movement is derived. In other words, the camera movement will have a predictable mathematical relationship, such as a combination of 3D-3D rigid body transformation and 3D-2D projection, with the location change 416, and thus can be calculated from location change 416. After the camera movement is determined based on the change in location of environment features 416, the next step is to estimate object features 408' in the later image 400' using the earlier object features 408 and the determined camera movement. This determined camera movement is used to generate an estimation of movement of object feature 408, shown by arrow 418 in FIG. 4B. Based on this estimated movement 418, the estimated location of the object feature 428 is calculated. The estimated object feature 428 is where the processor expects the object feature 408 to have moved based on the camera movement estimation 418 alone. In other words, if the object 404 has not moved, the estimated object features 428 will align with actual object features 408' in the later image 400'.

The next step is to locate, in the later image 400', matched object features 438 that are actual object features 408' in the later image 400' at a same location as the estimated object features 428 (S310). In other words, the processor generates the estimated object features and tries to locate object features 408' at those locations in the later image 400'. If the features are aligned, this is considered a matched object feature 438.

FIG. 4B shows an embodiment where object 404 has moved between the earlier image 400 and later image 400'. In contrast, FIG. 4C shows an embodiment where object 404 has not moved. As a result, there are no matched object features 438 in FIG. 4B, because the estimated object feature 428 is in a different location than the later object feature 408'. In several embodiments there are more than one object feature (408, 408'), estimated object feature (428), and matched object feature (438). In the exemplary embodiments of FIGS. 4A-4C, only one object feature is shown.

The next step is to determine that the object 404 has moved between the earlier image 400 and the later image 400' if a number of matched object features 438 does not exceed a threshold (S312). A further step is to determine that the object has not moved between the earlier image and the later image if the number of matched object features exceeds the threshold (S314).

In this case, if the threshold was zero, the processor would determine that the object had moved in FIG. 4B, because the number of matched object features 438 is zero (therefore does not exceed zero). On the contrary, the processor would determine that the object had moved in FIG. 4C, because the number of matched object features 438 is one in FIG. 4C, which exceeds zero. Therefore, the processor looks for object features at expected positions using the calculated camera motion, and if it fails to locate sufficient object features at the expected positions, it determines that the object has moved.

FIGS. 4A and 4B show an embodiment where the object 404 exhibits translative motion from one physical location to another. In other embodiments, the object merely rotates or does not move completely out of its own footprint within the earlier image 400. In these embodiments, the same analysis of whether motion has occurred can be applied. For example, if the object happens to pivot about one of the object points 408, there could be a matched feature for that object point in the later image 400'. However, other object points would not match. Thus, the threshold could be adjusted to adjust the accuracy/sensitivity of the algorithm to object movement.

If object was static at time 't−1' (in earlier image 400) but was also visible in the earlier image 400, its pose and the features belonging to the object as well as environment are known. However, if object starts moving in later image 400' at time 't' (later image 400'), pose as well as pose of the camera with respect to the world should be determined. When image at time 't' is passed to the 'Tracking' module 1086 in the SLAM 1080, it extracts features and finds matches with features in the map 1010. After finding matches, it estimates the pose of camera in world image of reference. Then this pose and matches are passed to the "Object Detection and Tracking" module 1082 of SLAM 1080.

The "Object Detection and Tracking" module 1082 has information about the position of object features 408 in the earlier image 400, using pose difference 418 from last and current pose it tries to find and match the object features 408 from earlier image 400 to the later image 400'. If object 404 is not moving then this matching process will give significant matches, otherwise there will be few to none matches. If matches are less than a certain threshold this module 1082 does a 3D object tracking employing, for example, a Kanade-Lucas-Tomasi (KLT) algorithm, instead of relying on SLAM tracking for the object pose. Specifically in this case, the KLT algorithm establishes 2D point correspondences between those consecutive image frames with respect to the object features. The module 1082 already have information, stored in the memory, about (i) 3D points (and their 3D coordinate values) in the 3D model coordinate system corresponding to the object features 408 in the earlier image frame, and (ii) the object pose (3D pose) corresponding to the earlier image frame. Once the 2D point correspondences have been made, the module 1082 derives the new object pose (new 3D pose) in the later image frame by minimizing the re-projection error using the 3D points and the 2D points in the later image frame found by the established correspondences.

Figure 9B:
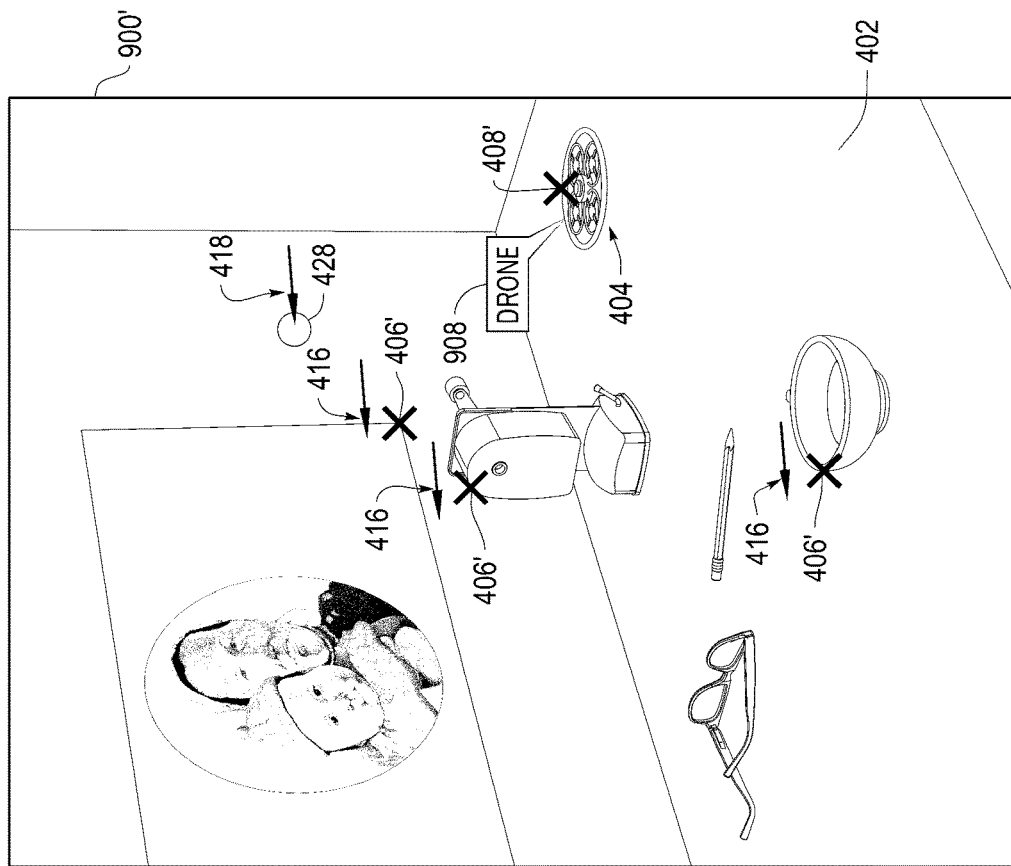
FIG. 9B is a displayed image corresponding to the image of FIG. 4B.
Figure 9A:
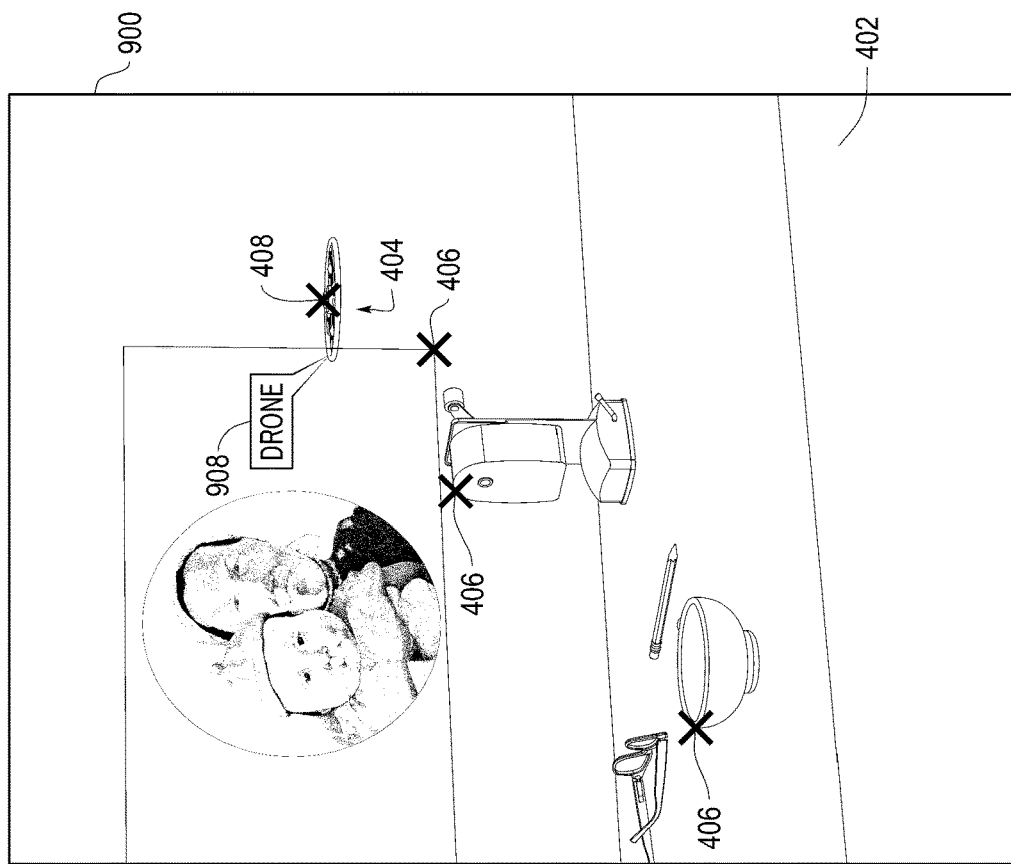
FIG. 9A is a displayed image corresponding to the image of FIG. 4A.
Figure 9C:
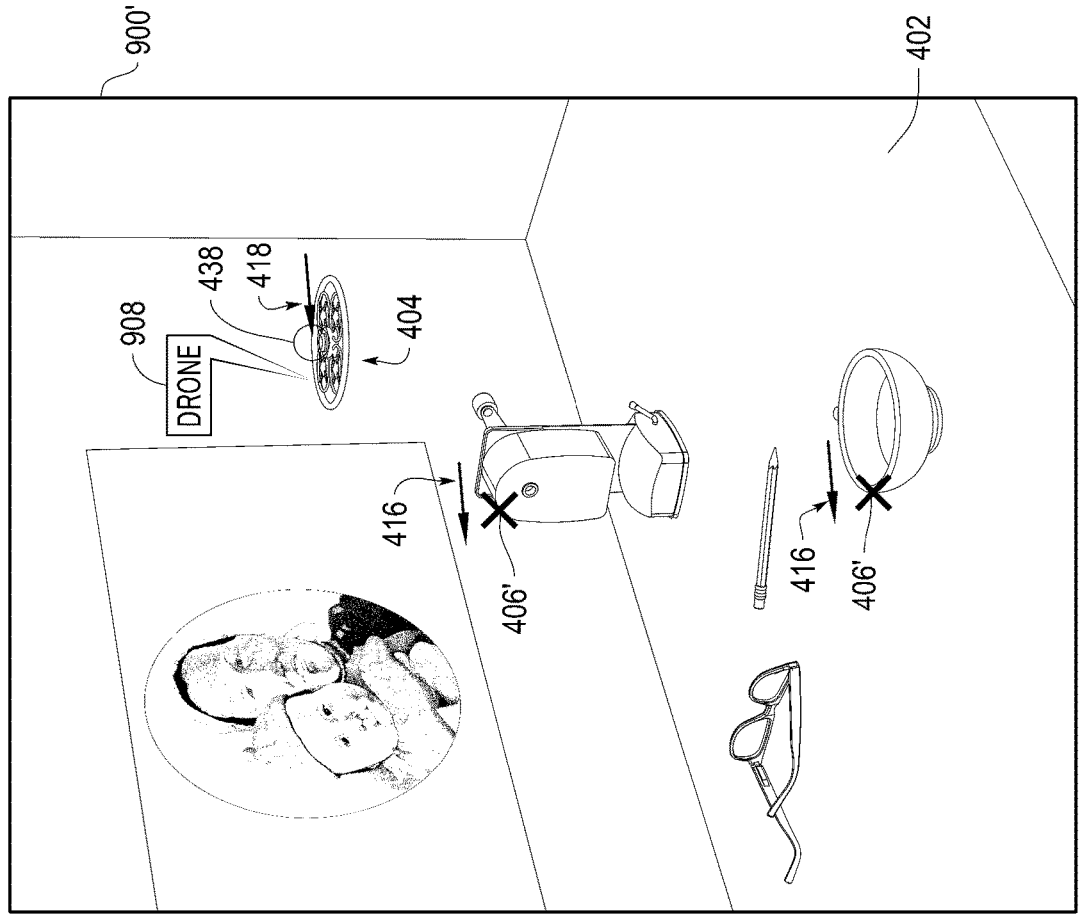
FIG. 9C is a displayed image corresponding to the image of FIG. 4C.

The next step is to display a notification if the object has moved (S316). In this step, the movement of the object is somehow indicated using a display (such as display 20), to e.g. a user. FIGS. 9A-9C show an earlier displayed image 900 and later displayed images 900', corresponding to the captured images of FIGS. 4A-4C. In the embodiments shown in FIGS. 9A-9C, if the object 404 is being tracked and a virtual image 908 is displayed at a location on the display corresponding to the object location, the virtual image 908 can be moved in response to the movement of the object 404.

As can be seen in FIGS. 9A-9C, the virtual image 908 is moved from FIGS. 9A→9B and 9A→9C. In FIG. 9C, the virtual image 908 changes location based on the camera motion 416. However, in FIG. 9B, the virtual image 908 is moved based on the object motion, so that the virtual image 908 stays in the same relative location as object 404 in later displayed image 900'.

Switching from SLAM to object tracking for moving objects and to SLAM when object stops moving is performed in some embodiments. Using the same techniques as described above if the object of interest 404 is detected as moving, system 1000 switches to Object Detection and Tracking module 1082 and SLAM 1080 resets its maps and does not process any further images. The Object Detection and Tracking module 1082 tracks the object using KLT tracking. If the pose with respect to the world frame of reference does not change for a certain period, this identifies that object has come to stop and normal SLAM processing starts again using the last pose from Object Detection and Tracking module 1082.

Figure 5:
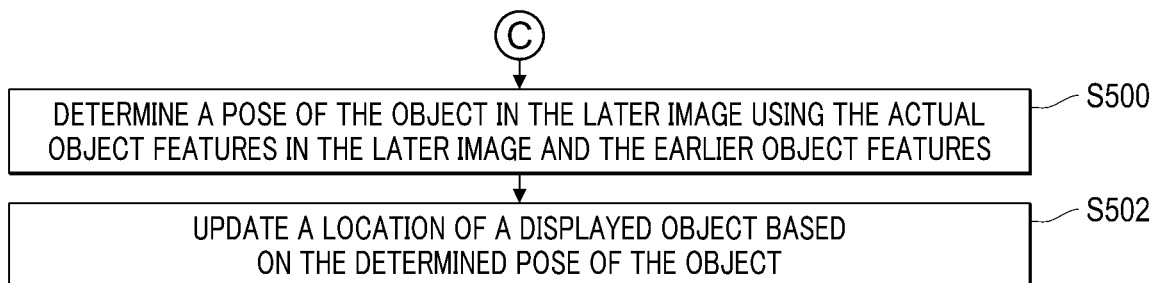
FIG. 5 is a flowchart of a method according to one embodiment.

An example of such a tracking method is shown in FIG. 5, including the step of determining a pose of the object 404 in the later image 400' using the actual object features 408' in the later image 400' and the earlier object features 408 (S500). The next step in this embodiment is to update a location of a displayed object 908 based on the determined pose of the object 404 (S502). This can be achieved by determining a movement from features 408 to 408' and moving the displayed object 908 a corresponding amount. In some embodiments, once it is determined that the object 404 has moved, the use of the SLAM algorithm for object tracking is discontinued, and the object is tracked using ODPE tracking. In other words, images in the image stream are analyzed directly for object movement by looking for object features 408, 408', and their relative position. The software uses this information to determine the movement of the object 404 within the field of view. The movement of the camera 60 and environment 402 would no longer be tracked in this embodiment, once object movement is established.

The displayed notification can take forms other than a displayed dialogue box, and these forms may be designed to increase the interactivity of the AR system. For example, if a real-world remote-control car is known to be moving (as determined by the methods described herein), virtual exhaust smoke or headlights can be displayed. On the other hand, if the car is known to not be moving, the smoke and lights are not displayed. This type of implementation could improve the entertainment value to the user. Alternatively, if the user is viewing real-world traffic, a warning tag could be selectively displayed on moving vehicles, so that safety is enhanced. Other forms of notifications indicating that a real-world object is moving or not moving can be displayed to the user in other embodiments.

Figure 6:
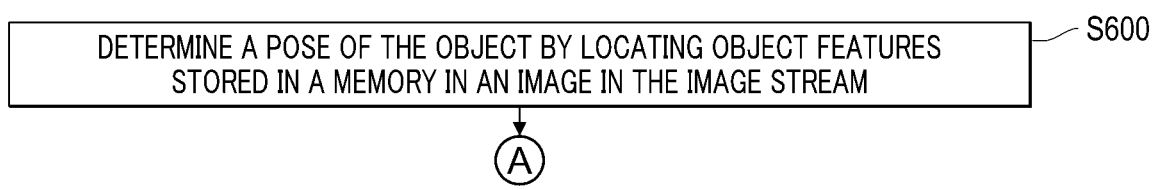
FIG. 6 is a flowchart of a method according to one embodiment.

In some embodiments, the pose of object 404 (with respect to the camera or the world image of reference) is determined before S300 is performed. One such embodiment is shown in FIG. 6. FIG. 6 shows that the processor determines a pose of the object 404 by locating object features 408 stored in a memory in an image in the image stream (S600), prior to the acquisition of the earlier image 400 and later image 400'. In such an embodiment, the camera 60 generates an image stream including images taken at regular intervals. The pose of object 404 is determined using e.g. ODPE and the CAD model of the object, as described previously. Once the object pose is known, this information can be used to differentiate earlier object features 408 from earlier environment features 406 in earlier image 400.

Figure 7:
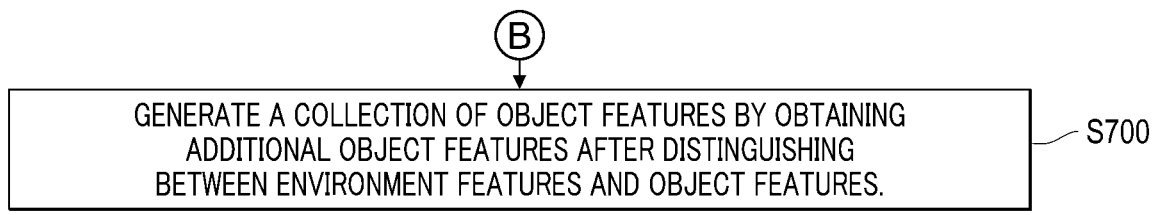
FIG. 7 is a flowchart of a method according to one embodiment.

In the embodiment of FIG. 7, after object features 408 are identified in S304, additional object features 408 are collected (S700). This is done to increase the number of object features 408 being tracked to improve the accuracy of the determination of the object movement, and object tracking in general. This can be achieved with the assistance of a CAD model of the object 404, or training data, which assists the processor in identifying key points (or features) on object 404. The features 408 may be areas of high contrast, edges, areas that are easy to recognize, or areas that are otherwise desirable for object tracking.

Figure 8:
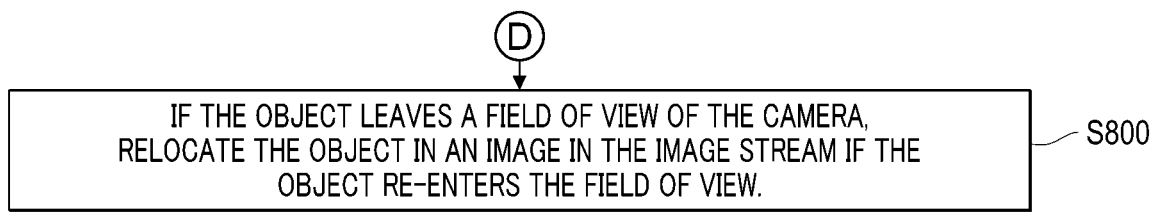
FIG. 8 is a flowchart of a method according to one embodiment.

One other responsibility of the Object Detection and Tracking module 1082 is that if SLAM tracking is working well and the object 404 was lost (potentially having moved out of field of view) this module tries to detect object 404 in a subsequent image using last feature and map information available. In the embodiment of FIG. 8, object 404 leaves the field of view of camera 60. This could occur due to camera motion 416, object motion, or both. In step S800, the processor relocates the object in an image in the image stream if the object 404 re-enters the field of view of camera 60. This can be achieved using ODPE, a CAD model, and/or training data, or updated 3D object map. For example features from the CAD model can be saved in the memory, and used to recognize the object 404 once it re-enters the field of view of the camera. Once the object 404 is located in the field of view, the method of FIG. 3 can resume.

Some embodiments provide a non-transitory storage medium (e.g. ROM 121, RAM 122) containing program instructions (i.e. software) that, when executed by a computer processor (e.g. CPU 140 or processing section 167), perform the methods described herein.

Although the invention has been described with reference to embodiments herein, those embodiments do not limit the scope of the invention. Modifications to those embodiments or different embodiments may fall within the scope of the invention.

What is claimed is:

1. A method of tracking an object in an environment using a moving camera, comprising:
    acquiring an earlier image and a later image of the environment from an image stream captured by the camera;
    identifying later environment features located in the environment in the later image, earlier environment features located in the environment in the earlier image, and earlier object features located on the object in the earlier image;
    determining a camera movement from the earlier image to the later image using a difference in location between the earlier environment features and the later environment features;
    estimating object features in the later image using the earlier object features and the determined camera movement;
    locating, in the later image, matched object features that are actual object features in the later image at a same location as the estimated object features;
    determining that the object has moved between the earlier image and the later image if a number of matched object features does not exceed a threshold; and
    determining that the object has not moved between the earlier image and the later image if the number of matched object features exceeds the threshold.

2. The method of claim 1, further comprising:
    displaying a virtual image based on motion of the object if the object has moved.

3. The method of claim 2, further comprising, if the object has moved:
    determining a pose of the object in the later image using the actual object features in the later image and the earlier object features; and
    updating a location of the virtual image based on the determined pose of the object.

4. The method of claim 1, further comprising, if the object leaves a field of view of the camera:
    relocating the object in an image in the image stream if the object re-enters the field of view.

5. The method of claim 1, further comprising:
    determining a pose of the object before the earlier image is acquired, by locating object features stored in a memory in an image in the image stream,
    wherein in the identifying earlier object features and earlier environment features, the pose of the object is used to distinguish between the earlier object features and the earlier environment features.

6. The method of claim 1, wherein the earlier environment features and earlier object features are identified by distinguishing between environment features and object features in an image in the image stream, further comprising:
    generating a collection of object features by obtaining additional object features after distinguishing between environment features and object features.

7. The method of claim 1, wherein the later image is a current image in the image stream, and the earlier image is acquired from a memory.

8. The method of claim 1, wherein the camera and display are components of one of: a head mounted display, a smartphone, and a tablet.

9. A head mounted display that tracks an object in an environment, comprising:
    a camera that captures an image stream of the environment, including an earlier image and a later image;
    a processor configured to:
        identify later environment features located in the environment in the later image, earlier environment features located in the environment in the earlier image, and earlier object features located on the object in the earlier image;
        determine a camera movement from the earlier image to the later image using a difference in location between the earlier environment features and the later environment features;
        estimate object features in the later image using the earlier object features and the determined camera movement;
        locate, in the later image, matched object features that are actual object features in the later image at a same location as the estimated object features;
        determine that the object has moved between the earlier image and the later image if a number of matched object features does not exceed a threshold; and
        determine that the object has not moved between the earlier image and the later image if the number of matched object features exceeds the threshold.

10. The head mounted display of claim 9, further comprising:
    a display that displays a virtual image based on motion of the object if the object has moved.

11. The head mounted display of claim 10, wherein the processor is further configured to, if the object has moved:
    determine a pose of the object in the later image using the actual object features in the later image and the earlier object features; and
    update a location of the virtual image based on the determined pose of the object.

12. The head mounted display of claim 9, wherein the processor is further configured to, if the object leaves a field of view of the camera:
    relocate the object in an image in the image stream if the object re-enters the field of view.

13. The head mounted display of claim 9, wherein the processor is further configured to:
    determine a pose of the object before the earlier image is acquired, by locating object features stored in a memory in an image in the image stream,
    wherein in the identifying earlier object features and earlier environment features, the pose of the object is used to distinguish between the earlier object features and the earlier environment features.

14. The head mounted display of claim 9, wherein the processor:
    identifies the earlier environment features and earlier object features by distinguishing between environment features and object features in an image in the image stream, and
    is further configured to generate a collection of object features by obtaining additional object features after distinguishing between environment features and object features.

15. The head mounted display of claim 9, further comprising:
    a memory, wherein the later image is a current image in the image stream, and the earlier image is acquired from the memory.

16. A non-transitory computer readable medium that embodies instructions that cause one or more processors to perform a method comprising:

acquiring an earlier image and a later image of an environment from an image stream captured by a camera;

identifying later environment features located in the environment in the later image, earlier environment features located in the environment in the earlier image, and earlier object features located on the object in the earlier image;

determining a camera movement from the earlier image to the later image using a difference in location between the earlier environment features and the later environment features;

estimating object features in the later image using the earlier object features and the determined camera movement;

locating, in the later image, matched object features that are actual object features in the later image at a same location as the estimated object features;

determining that the object has moved between the earlier image and the later image if a number of matched object features does not exceed a threshold; and determining that the object has not moved between the earlier image and the later image if the number of matched object features exceeds the threshold.

17. The non-transitory computer readable medium of claim 16, wherein the method further comprises:

instructing a display to display a virtual image based on motion of the object if the object has moved.

18. The non-transitory computer readable medium of claim 17, wherein the method further comprises, if the object has moved:

determining a pose of the object in the later image using the actual object features in the later image and the earlier object features; and updating a location of the virtual image based on the determined pose of the object.

19. The non-transitory computer readable medium of claim 16, wherein the method further comprises, if the object leaves a field of view of the camera:

relocating the object in an image in the image stream if the object re-enters the field of view.

20. The non-transitory computer readable medium of claim 16, wherein the method further comprises:

determining a pose of the object before the earlier image is acquired, by locating object features stored in a memory in an image in the image stream, wherein in the identifying earlier object features and earlier environment features, the pose of the object is used to distinguish between the earlier object features and the earlier environment features.

* * * * *